United States Patent [19]

Stadnick

[11] 4,023,604
[45] May 17, 1977

[54] FLAIL TYPE TREE DELIMBING DEVICE

[76] Inventor: Michael Stadnick, Box 509, Swan River, Manitoba, Canada

[22] Filed: Dec. 15, 1975

[21] Appl. No.: 640,410

Related U.S. Application Data

[63] Continuation-in-part of Ser. No. 560,948, March 21, 1975, abandoned.

[52] U.S. Cl. .................. 144/2 Z; 56/208; 144/208 J; 144/218; 403/61
[51] Int. Cl.² .......................... B27L 1/00
[58] Field of Search .............. 56/29, 7, 208, 209, 56/210, 211, 212, 213, 214, 215, 216, 217; 144/2 Z, 3 D, 208 R, 208 J, 311, 218, 240; 403/61; 83/800, 370, 564, 928; 74/522, 527

[56] References Cited

UNITED STATES PATENTS

| | | |
|---|---|---|
| 2,501,925 | 3/1950 | Yewsen et al. ............... 144/208 J |
| 3,727,385 | 4/1973 | Twidale et al. ................ 56/208 |
| 3,783,594 | 1/1974 | Watt et al. ................... 56/208 X |

*Primary Examiner*—Othell M. Simpson
*Assistant Examiner*—W. D. Bray
*Attorney, Agent, or Firm*—Stanley G. Ade

[57] ABSTRACT

The device comprises a rotating drum having flails secured to the outer surface thereof. It is mounted between arms extending from a truck or the like and can be raised and lowered hydraulically. The device is driven over a pile of small trees lying on the ground, with the drum rotating so that flails engage the branches and leaves, etc., and detaches them from the trunks, it being understood that the flails engage between adjacent trees as well as engaging branches which might be extending upwardly from the trunks.

2 Claims, 6 Drawing Figures

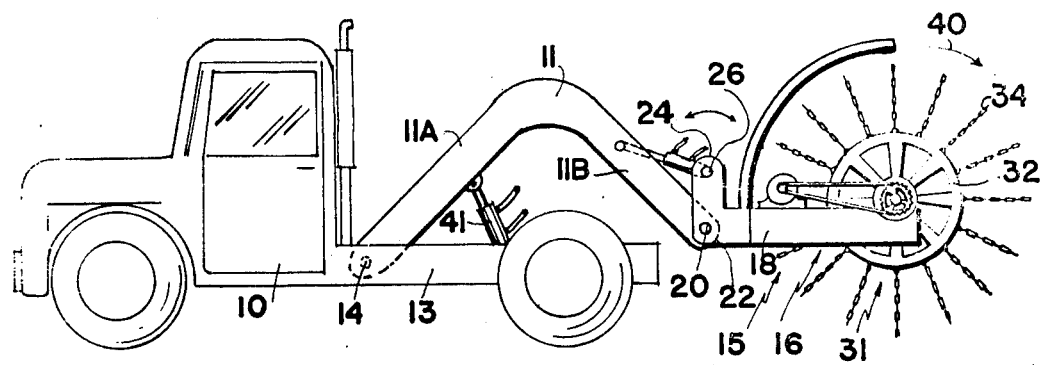
FIG. 1
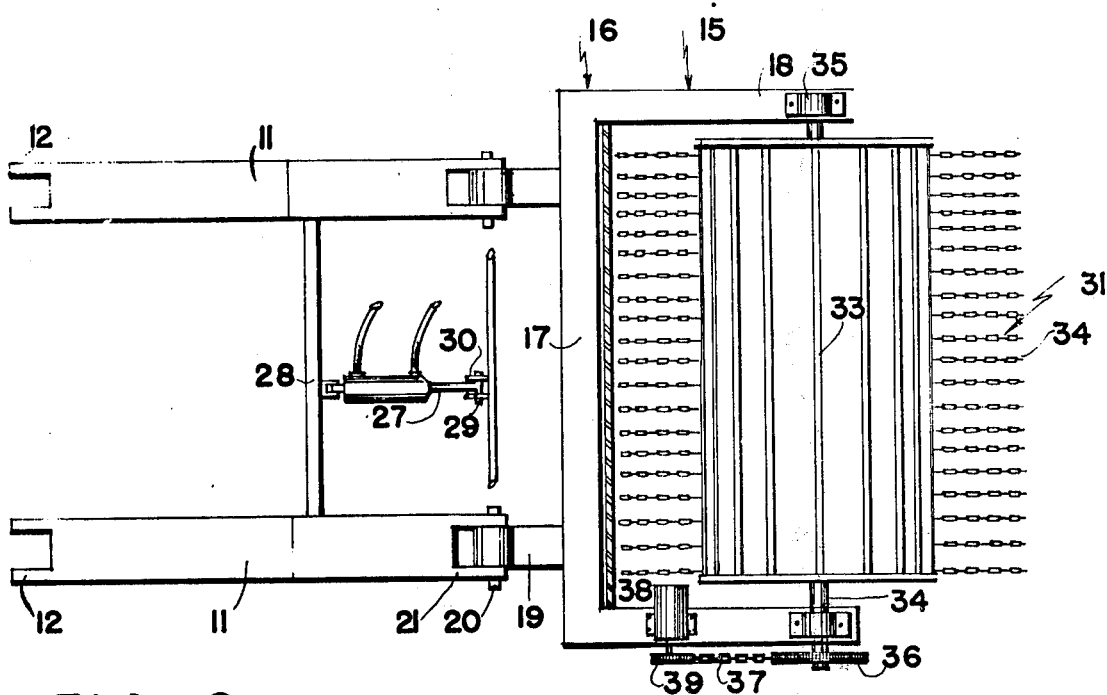
FIG. 2
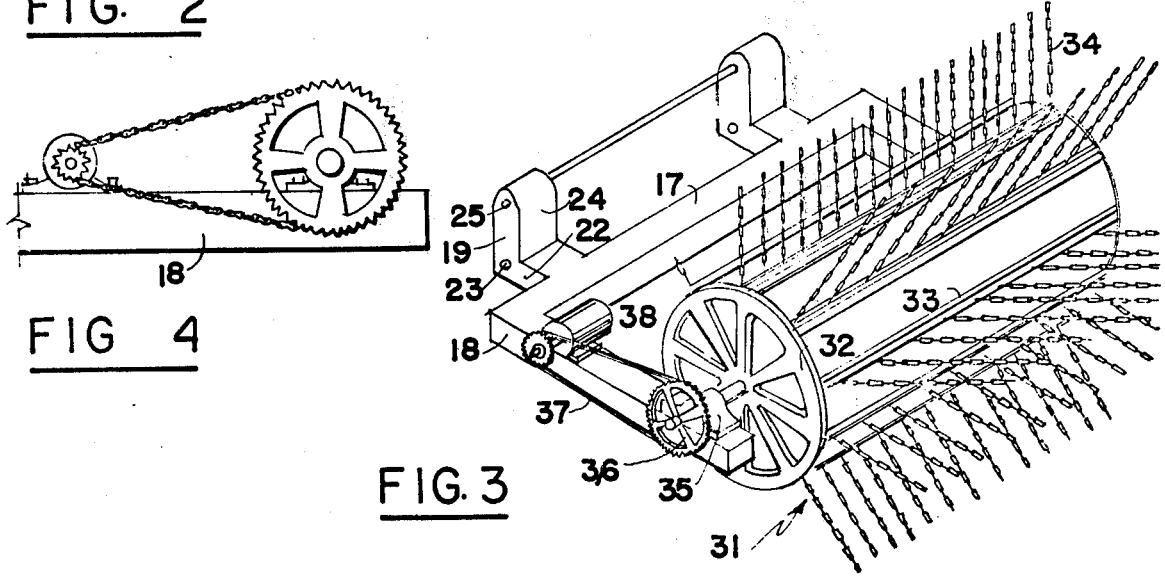
FIG. 4
FIG. 3

FLAIL TYPE TREE DELIMBING DEVICE

BACKGROUND OF THE INVENTION

This invention relates to new and useful improvements in delimbing machines and is a continuation-in-part of Ser. No: 560,948, dated Mar. 21, 1975 and now abandoned.

In the production of raw forest products for remanufacture, rapidly escalating labour costs in this labour-intensive industry have made it increasingly necessary to device new means to decrease labour content of the work, thereby increasing man-day productivity, and minimize the production costs through mechanization. In some cases it is necessary to mechanize, not only to hold costs but to get the job done due to the shortage of trained and willling woods workers.

In the small tree forest comprises of 2 to 20 merchantable cubic feet per tree, true mechanization only started in the early 1950's with the introduction of the power chain saw. The rubber tired skidder in the early 1960's replaced the horse as a forwarding unit. Since, then, many new developments have appeared in the woods in a continuing effort to remove the hazardous, strenous labour content of log production and increase the daily volume potential per man, thereby reducing costs.

Most of the new developments in harvesting equipment were very sophisticated and expensive. These machines treat one or more, or all, of the steps involved to fell, limb, top, forward, buck and pile at roadside with varying degrees of success. Almost invariably they process a single tree at a time.

The hydraulic shear for felling the tree has been in use for more than ten years. It has been used in some form or another on most of the harvesting machines developed to date. This gives very little trouble now. Most problems occur in the other processing mechanisms that remove the limbs and tops. There are available now, under various trade names, dependable feller-bunchers utilizing the shear or other cutting devices, which are able to grapple the tree near ground level, serve the bole, and place the whole tree down in a selected spot, in bunches or in uniform windrows for further forwarding.

All attempts to date to incorporate a delimbing process into a feller-buncher machine have had certain undesirable attributes. The main problem is high downtime due to complicated and expensive mechanisms, and the uneconomical aspect due to low production from handling one tree at a time. To date there is not a multiple tree processor commercially available.

The rubber-tired skidder or forwarder equipped with cable chokers or grapple has emerged as a dependable means of moving the felled trees, complete with limbs and top (full tree), or with limbs and unmerchantable top removed (tree length) to roadside for further processing.

Dependable means are available to reduce the tree-length to short-wood and pile down for hauling.

Industry recognizes an acceptable means of mechanically taking standing trees of variable size from an heterogeneous forest, and placing them in even, uniform bunches or windrows, suitable for forwarding with a proven vehicle.

What is not available at the present time is a simple, inexpensive means to mechanically remove branches from the trees after they have been placed in bunches or windrows at the stump area, the roadside landing, or somewhere in between.

SUMMARY OF THE INVENTION

The present invention provides a flail which is simple, inexpensive, lightweight, high productive useful tool that fills an important need in the woodlands harvesting industry, namely that of providing a multiple tree delimber. It is a method that fits into many different harvesting systems in many different types of forest and terrain.

The new and useful lightweight attachment is powered and carried by a conventional truck, tractor, skidder, front-end loader or the like. The mobile vehicle which is used as a carrier can be one of many vehicles proven in woodlands applications and the carrier does not comprise part of the invention. The carrier is chosen to suit the type of forest or terrain requirements. The flail delimbing attachment can be mounted on the front or the rear of any of the above.

In the field the device is attached to a suitable mobile self-propelled carrier. The carrier will have adequate engine power for self-propelling, steering, raising and lowering the attachment as well as to power the hydraulic pump to provide fluid power to the motor that rotates the drum. The proper carrier will ideally have an hydrastatic transmission which has an infinite range of travel speeds to the driving wheels, from zero to four miles per hour, during the delimbing process. A direct drive transmission may be chosed if the first gear at full throttle is less than 1 mile per hour. The ground speed must be maintained slow enough to allow the operator to control the steering, raise and lower the attachment to suit the conditions, and at the same time to maintain high engine revolutions to supply adequate power to drive the pump. The same thing can be accomplished by means of an auxilliary engine to power the pump. The possibility is also recognized of powering the flail by mechanical linkage rather than fluid means but for the sake of simplicity and minimizing maintenance, fluid power is more suitable.

Trees are felled mechanically and bunched in a parallel manner for subsequent forwarding, or alternatively, after forwarding full trees to an intermediate or final processing place they are placed parallel to one another in no more than one or two layers deep. The machine can then pass over a plurality of full trees, in the same direction as the trees are lying that is, butt towards the top or vice versa, and remove the majority of the limbs—those on the upper surface and on the sides of the bole of the tree—thereby providing a service that was heretofore not available by other than manual means. A chain saw operator works along the flail to cut off the unmerchantable tops and few remaining branches. These two men can do at least as much as ten power saw men could do previously. The upper limit of production has not yet been established. It depends on operating technique—the better the system, the better the production from the flail. Depending upon the mobility of the carrier chosen, the flail can service more than one felling or forwarding system.

The flail is pivotally raised and lowered by fluid means at the operator's discretion, depending on the amount of limbs or the size of the bunch of trees. As the drum rotates, the flails are stiffened by centrifugal force and the fiails break or tear off the branches as the unit is propelled over the surface of the felled trees. The outer peripheral speed of the flails has to be maintained at at least 8500 feet per minute. The flails are attached by one end only, and so arranged and rotated that the outer end of more than one flail comes in contact with the bole of the tree n the same place. The ground speed of the carrier machine is controlled by the operator to suit the tree growth and terrain conditions.

The flail can be made detachable by means of pins and quick-couplers in the hydraulic hoses or the like, so that the carrier unit can be used for alternate work if required. Being an inexpensive attachment in the first place, and not having to tie up an expensive carrier full time if production parameters are such that there is not a full time demand for the flail, makes this delimbing device very economical compared to other devices available in the art.

The valving is arranged for detent position when engaged (rotating), and has the capability to stall under shock load without causing failure in hoses, pump, motors or valves. The same drive can also recover quickly to full rpm as soon as the drum is raised away from the heavy load. The valving is set up to override or free spool for the same reason, should the fluid source be cut off inadvertently. Provision is made, either in the valving of the lift control or the mechanical mounting so that the attachment can free-float one way up—in case the carrier drops suddenly on rough terrain causing the attachment to come in contact with the trees or other obstacle, as it will be appreciated that if it is rigid, there would be breakage.

The logging industry has long recognized the potential hazards connected with the use of the gasoline powered chain saw. Due to the lack of alternatives, the chain saw has, of necessity, been used to remove the limbs and branches. The majority of chain saw accidents causing cuts to operators occur during the delimbing process. It is desirable to eliminate or minimize this hazardous strenuous work. With the labour shortage as it is, it is increasingly difficult to find workmen to do this job, and the untrained people who end up doing it, end up cutting themselves. The delimbing flail provides an alternative which is far more economical and virtually eliminates a work area that has a high accident frequency.It is now only necessary to remove the unmerchantable tops with the chain saw, and in some systems this can be done at another processing point by other means.

The present invention overcomes these disadvantages by providing a rotating drum having flails extending outwardly therefrom. The drum is driven over a pile of small trees lying on the ground so that the flails detach the leaves and branches from the trunks.

The principal essence of the invention is to provide a device of the character herewithin described which can be secured to a source of power and driven over a pile of small trees lying on the ground in order to delimb same and remove twigs, leaves, etc.

Another object of the invention is to provide a device of the character herewithin described in which the height of the flail drum can be adjusted within limits.

A still further object of the invention is to provide a device of the character herewithin described which prepares relatively small trees for use in paper mills and the like, and in an economical manner.

A still further object of the invention is to provide a device of the character herewithin described which is simple in construction, economical in manufacture and otherwise well suited to the purpose for which it is designed.

With the foregoing objects in view, and othe such objects and advantages as will become apparent to those skilled in the art to which this invention relates as this specification proceeds, my invention consists essentially in the arrangement and construction of parts all as hereinafter more particularly descirbed, reference being had to the accompanying drawings in which:

DESCRIPTION OF THE DRAWINGS

FIG. 1 is a side elevation of the device mounted upon a truck.

FIG. 2 is a top plan view of the device per se.

FIG. 3 is an isometric view of the device per se.

FIG. 4 is an enlarged fregmentary side elevation showing the drive mechanism for the flail drum.

In the drawings like characters of reference indicate corresponding parts in the different figures.

DETAILED DESCRIPTION

Figure 5:
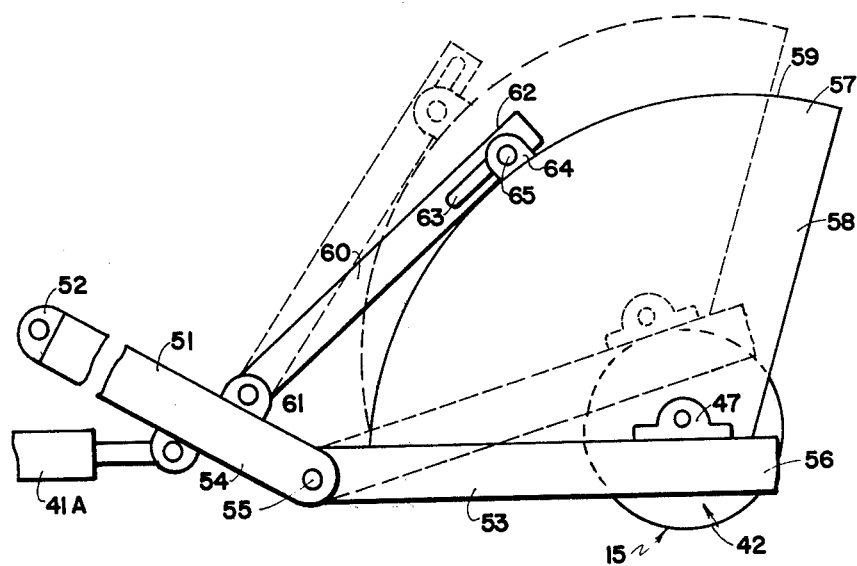
FIG. 5 is a partial side elevation of the device showing an alternative embodiment.

Proceeding therefore to describe the invention in detail, reference character 10 illustrates a source of power such as a truck, skidder or the like.

A pair of spaced and parallel mounting arms 11 are pivotally secured by the ends 12 thereof, between the longitudinal frame members 13 of the truck frame and these mounting arms include the inboard portions 11A which extend upwardly and rearwardly from the point of attachment 14 and then extend downwardly and rearwardly to form the outboard portions 11B.

The device collectively designated 15 consists of a substantially U-shaped frame collectively designated 16. This frame includes a cross member 17 and a pair of spaced and parallel arms 18 one of which extends from each end of the cross member 17.

Two pairs of attaching lugs 19 extend rearwardly from the cross member 17 and a pivot pin 20 pivotally engages these lugs within the distal ends 21 of the outboard portions 11B of the mounting arms 11.

The lugs 19 include the base portions 22 which are apertured as at 23 to be engaged by pivot pin 20, and upwardly extending portions 24 which are also apertured as at 25 vertically above the apertures 23.

A cross member 26 pivotally engages within these apertures 25 and a piston and cylinder assembly 27 is pivotally secured by one end thereof to a cross member 28 extending between the mounting arms 11 and is connected by means of pivot 29, between a pair of lugs 30 extending from the cross member 26.

Operation of the fluid operator 27 will cause the frame 16 to pivot around pivot pins 20 in a substantially vertical arm.

A flail drum collectively designated 31 is provided and consists of a pair of end plates 32 which, in this embodiment are substantially circular. A plurality of cross members 33 extend in spaced and parallel relationship transversely between the end plates. and are attached to the peripheries of the end plates as clearly shown in FIG. 3.

A plurality of flexible flails 34 are provided and in this embodiment, these flails consist of a short length of chain secured by one end thereof to the cross bars 33.

There is a set of flails for each cross bar as clearly shown in the drawings and although chains are shown, nevertheless it will be appreciated that other forms of flexible flail can be used such as cables with weights on each end thereof.

A shaft 34 mounts the flail for rotation within bearing blocks 35 secured adjacent the distal ends of the arms 18 with the drum extending transversely therebetween.

An extension of shaft 34 is provided with a sprocket wheel 36 around which a sprocket chain 37 is engaged. An hydraulic motor 38 is secured to one arm 16 and is also provided with a relatively small sprocket wheel 39 around which chain 37 extends so that the hydraulic motor 38 acts as a source of power for rotating the flail drum assembly 31 in the direction of arrow 40.

The hydraulic motor is connected to a source of hydraulic power (not illustrated) within the main source of power in the form of truck 10 or the like.

Similarly, the fluid operator 27 is connected to this source of hydraulic power and, if desired, a further fluid operator 41 extends between the truck frame and the mounting arms 11 so that these mounting arms can be raised and lowered within limits to adjust the operating position of the flail drum 31.

In operation, the device is driven over a small pile of relatively small trees lying on the ground with the flail drum rotating in the direction of arrow 40. Centrifugal force causes the chains 34 to extend radially outwardly from the drum as clearly shown and these flails detach leaves and branches from the trunks of the trees, it being understood that the device is driven along the length of the tree trunks. The flails penetrate between the individual tree trunks and remove the majority of branches and leaves therefrom.

If some leaves and branches are left on the undersides of the tree trunks, these are easily rolled so they become exposed and the machine is driven over the trunks once again.

The apparatus is simple in construction and is easily mounted upon any convenient truck or the like so that it can be driven from one pile of trees to the other for the delimbing process.

Although the flails are shown situated upon the bars 33 which extend transversely, it will be appreciated that the bars can be curved so that the flails extend from the drum in a spiral formation.

Figure 6:
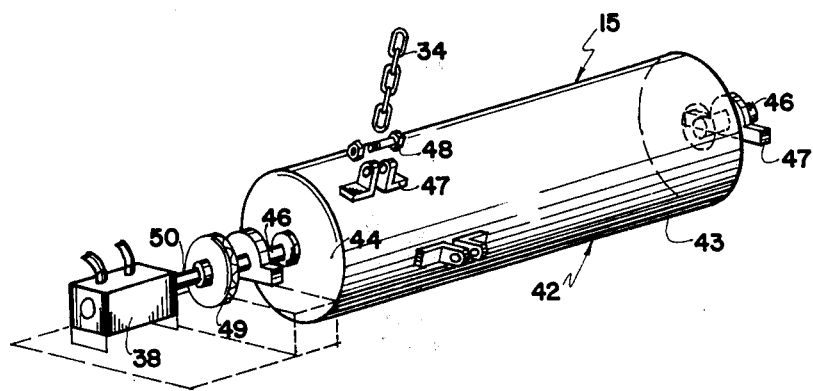
FIG. 6 is partially exploded isometric view of one embodiment of the drum and drive means per se.

FIG. 6 shows an alternative drum construction in which the drum collectively designated 42 comprises a length of pipe or tube 43 having ends plates 44 through which support shafts 45 and 46 extend. These shafts 45 and 46 are mounted in pillow blocks 47 which in turn are supported upon the members 18 in a manner similar to the previous embodiment.

A plurality of angled clips or lugs 47 are secured to the periphery of the drum as by welding or the like and links of flail chain 34 are secured by one end thereof to these lugs or clips by means of nut and bolt assemblies 48.

A falk type coupling 49 connects shaft 46 to a drive shaft 50 extending from an hydraulic motor 38 as illustrated.

However it will be appreciated that many other forms of drive connections can be provided to connect a source of power such as a hydraulic motor, to the flail assembly 15.

FIG. 5 shows an alternative embodiment which permits the flail assembly to "free-float" in an upwardly direction. Such a mechanism is required in order to prevent damage occurring to the flail assembly, particularly the pillow blocks, if the flail assembly hits the ground or a tree trunk rather than the limbs thereof.

In the foregoing embodiment, this free-floating movement can be provided for hydraulically but FIG. 5 illustrates a mechanical arrangement which is simplier in construction.

The frame of the frail assembly includes a pair of main arm 51 one only of which is shown in FIG. 5, these arms being pivoted to the source of power such as the truck, by means of ends 52.

These arms are similar to arms 11 hereinbefore described and are raised and lowered by a fluid operator 41A connected thereto as clearly shown.

Secondary arms 53 are secured by one end thereof to the other end 54 of the main arms 51, pivots 55 showing this connection and the aforementioned pillow blocks 47 are mounted towards the distal ends 56 of these secondary arms 53 thus mounting the flail assembly 15 therebetween.

In both embodiments, a shroud quadrant 57 is provided shrouding the rear upper quadrant of the flail assembly and being spaced from the distal ends of the flail chains 34 when same are extended by centrifugal force as hereinbefore described. In the embodiment shown in FIG. 5, this shroud includes end plates 58 and an arcuately curved upper plate 59.

At least one link 60 is provided and is pivotally secured by one end thereof to intermediate the ends of the primary arms 51 as indicated by reference character 61.

The other end 62 of this link 60 is provided with a close ended slot 63 through which the link 60 is secured to a lug 64 extending upwardly from the plate 59 of the shroud. A bolt 65 connects the lug to the link 60 within the slot 63 and by tightening this bolt 65, a fricitional connection is provided which is adjustable within limits.

Normally, the weight of the flail assembly maintains the bolt 65 at the outer extremity of the slot 63 as shown in solid line in FIG. 5 and the entire assembly may be raised or lowered by means of the fluid operator 41A so that the pivot points 55 are normally solid and no relative movement occurs between the main arms 51 and the secondary arms 53. However if the flail drum strikes an obstruction, then it may move upwardly whereby bolt 65 slides along slot 63 towards the other end of slot 63 as shown in phantom in FIG. 5 under which circumstances of course the secondary arms 53 pivot around pivot points 55 relative to the main arms 51 thus preventing damage occuring to the assembly, particularly to the pivot block bearing 47. As soon as the obstruction is passed, gravity returns the assembly to the solid line position illustrated in FIG. 5.

Although the slots 63 are shown within the outer ends 62 of links 60, nevertheless it will of course be appreciated that other such loose link arrangements may be utilized.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A flail type delimbing machine for use with a source of power such as a skidder, truck or the like, comprising in combination a supporting frame, means to detachable secure said frame to said source of power, flail means, means mounting said flail means transversely within said frame for rotation means including a supporting surface and a plurality of flexible flails secured by one end thereof to said supporting surface by centrifugal force when said flail means rotates, a shroud portion enclosing the rear upper quadrant of said flail means and being spaced from the distal ends of said flexible flails when said flexible flails are extended as aforesaid, means to pivotally connect said supporting frame to said source of power, fluid operating means extending between said source of power and said supporting frame to pivot said supporting frame in a vertical arc around said means to pivotally connect said supporting frame to said source of power, means whereby said supporting frame and said flail means free floats in the upward direction if said flail means encounters resistance above a predetermined amount, in order to prevent damage from occurring to said flail means, said supporting frame including a pair of main arms pivotally secured by one end thereof of said source of power, a pair of secondary arms each pivotally secured by one end thereof to the other ends of one of said main arms, said flail means being journalled for rotation between said secondary arms, said fluid operating means extending between said source of power and said main arms, at least one link secured by one end thereof to said main arms intermediate the ends thereof and by the other end thereof to said shroud, and a frictionally controlled loose link connection between said link and said shroud whereby said flexible means by free-float upwardly as aforesaid.

2. The machine according to claim 1 in which said supporting frame is substantially U-shaped in plan and includes a cross member and a pair of spaced and parallel arms extending one from each end of said cross member, and lying substantially horizontally relative to the ground, said means to detachably secure said frame to said source of power including a pivotal connection between said cross member and said source of power, said flail means including a drum journalled for rotation between the distal ends of said pair of arms, said flexible flails comprising lengths of chain secured by one end thereof to the peripheral surface of said drum.

* * * * *